US012809351B2

(12) United States Patent
Li et al.

(10) Patent No.: US 12,809,351 B2
(45) Date of Patent: Nov. 24, 2026

(54) MATERIAL FEEDING CONTROL METHOD AND APPARATUS, ELECTRONIC DEVICE, AND READABLE STORAGE MEDIUM USING VERIFICATION INFORMATION TO VERIFY THE MATERIAL FED

(71) Applicant: CONTEMPORARY AMPEREX TECHNOLOGY (HONG KONG) LIMITED, Hong Kong (CN)

(72) Inventors: Minbo Li, Ningde City (CN); Lei Song, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 564 days.

(21) Appl. No.: 18/358,029

(22) Filed: Jul. 25, 2023

(65) Prior Publication Data

US 2024/0272622 A1 Aug. 15, 2024

Related U.S. Application Data

(63) Continuation of application No. PCT/CN2023/081960, filed on Mar. 16, 2023.

(30) Foreign Application Priority Data

Feb. 13, 2023 (CN) ......................... 202310108032.2

(51) Int. Cl.
*G05B 19/418* (2006.01)

(52) U.S. Cl.
CPC .... *G05B 19/41835* (2013.01); *G05B 19/4183* (2013.01); *G05B 2219/31302* (2013.01);
(Continued)

(58) Field of Classification Search
CPC .......... G05B 19/41835; G05B 19/4183; G05B 2219/31302; G05B 2219/31304;
(Continued)

(56) References Cited

U.S. PATENT DOCUMENTS 6,778,878 B1 * 8/2004 Kou .................. H05K 13/0417 700/95
2003/0072481 A1 4/2003 Wooten et al.
(Continued)

FOREIGN PATENT DOCUMENTS

CN 109615041 A 4/2019
CN 109685180 A 4/2019
(Continued)

OTHER PUBLICATIONS

Summons to Attend Oral Proceedings, mailed May 27, 2025, for corresponding European Patent Application Serial No. 23728248.8.
(Continued)

*Primary Examiner* — Jonathan Michael Skrzycki
(74) *Attorney, Agent, or Firm* — K&L Gates LLP

(57) ABSTRACT

Disclosed are a material feeding control method and apparatus, an electronic device, and a readable storage medium. The method includes: obtaining verification information of the material being fed; and under a condition that the verification information of the material being fed is determined to be identical to verification information of historical feeds, generating a first abnormal operation signal, where the first abnormal operation signal includes a first alarm signal and/or a signal for controlling a device end to stop an operation; or under a condition that the verification information of the material being fed is determined to be different from the verification information of the historical feeds,
(Continued)

generating an operation signal, where the operation signal includes a signal for controlling the device end to initiate a suction operation.

14 Claims, 6 Drawing Sheets

(52) U.S. Cl.
CPC .............. *G05B 2219/31304* (2013.01); *G05B 2219/31308* (2013.01); *G05B 2219/31368* (2013.01)

(58) Field of Classification Search
CPC ........... G05B 2219/31308; G05B 2219/31368; G05B 19/4184; G05B 19/41865; G06Q 10/06; G06Q 10/087; G06Q 10/0875
See application file for complete search history.

(56) References Cited

U.S. PATENT DOCUMENTS

| | | | | |
|---|---|---|---|---|
| 2003/0212467 A1* | 11/2003 | Ogihara | G06Q 10/06 | 700/226 |
| 2005/0113957 A1* | 5/2005 | Gallu | G05B 19/4183 | 700/109 |
| 2013/0184847 A1* | 7/2013 | Fruh | G05B 19/41875 | 700/109 |
| 2015/0057793 A1* | 2/2015 | Kawano | G06Q 10/087 | 700/216 |
| 2016/0221187 A1* | 8/2016 | Bradski | B25J 9/162 | |
| 2017/0262864 A1* | 9/2017 | Sager | G06Q 30/0185 | |
| 2018/0178452 A1* | 6/2018 | Costabeber | B33Y 50/02 | |

FOREIGN PATENT DOCUMENTS

| | | | |
|---|---|---|---|
| CN | 112101711 | A | 12/2020 |
| CN | 112488257 | A | 3/2021 |
| CN | 113687623 | A | 11/2021 |
| EP | 3741692 | A1 | 11/2020 |

OTHER PUBLICATIONS

The extended European search report received in the counterpart European application 23728248.8, mailed on Sep. 3, 2024.

International Search Report received in the corresponding International Application PCT/CN2023/081960, mailed Aug. 7, 2023.

Written Opinion received in the corresponding International Application PCT/CN2023/081960, mailed Aug. 7, 2023.

* cited by examiner

MATERIAL FEEDING CONTROL METHOD AND APPARATUS, ELECTRONIC DEVICE, AND READABLE STORAGE MEDIUM USING VERIFICATION INFORMATION TO VERIFY THE MATERIAL FED

CROSS-REFERENCE TO RELATED APPLICATIONS

This application is a continuation of International Application No. PCT/CN2023/081960, filed on Mar. 16, 2023, which claims priority to Chinese Patent Application No. 202310108032.2, filed on Feb. 13, 2023 and entitled "MATERIAL FEEDING CONTROL METHOD AND APPARATUS, ELECTRONIC DEVICE, AND READABLE STORAGE MEDIUM", which is incorporated herein by reference in its entirety.

TECHNICAL FIELD

This application relates to the field of automation control technologies and, in particular, to a material feeding control method and apparatus, an electronic device, and a readable storage medium.

BACKGROUND

In the manufacturing industry, a product is typically formed by mixing and stirring a dozen or more raw materials with several settings, and these raw materials have many substitute materials or designated materials. In the process of product production, there are clear regulations and production specifications for each material or substitute in terms of type, weight, mixing process, and mixing time limit. An error in feeding or production of a single material can result in the rejection of an entire batch of products.

At present, most material feedings are conducted via code scanning-based verification manner in the process of product production and processing. In the commonly used code scanning-based verification manner, material feeding can be performed provided that the materials being fed are the same as the desired materials. However, in the actual application process, for the convenience and quickness of product processing, operators may perform some operations that do not conform to the production operation specifications, for example, using the same check code to feed multiple identical materials, resulting in some problems and hidden dangers such as impossibility to trace sources for material quality.

SUMMARY

In view of the foregoing problems, this application provides a material feeding control method and apparatus, an electronic device, and a readable storage medium, to solve the problem of impossibility to trace sources for material quality that exists in the commonly used verification method of scanning material codes.

According to a first aspect, this application provides a material feeding control method. The method includes: obtaining verification information of a material being fed; and under a condition that the verification information of the material being fed is determined to be identical to verification information of historical feeds, generating a first abnormal operation signal, where the first abnormal operation signal includes a first alarm signal and/or a signal for controlling a device end to stop an operation.

In the technical solutions of embodiments of this application, this solution first obtains the verification information of the material being fed; then compares the verification information of the material being fed with the verification information of the historical feeds; under a condition that the verification information of the material being fed is determined to be identical to the verification information of the historical feeds, generates the first abnormal operation signal; and based on the first abnormal operation signal, generates an alarm and/or controls the device end to stop suction of the material being fed. In comparison with the existing material code scanning-based verification method in which only a verification code is compared with a material code of a desired material, this solution does not feed a material with duplicate verification information detected during the material feeding process to ensure that each fed material has its unique verification information. In this way, when a quality problem is found among materials that have been fed, a material with the quality problem can be traced based on verification information of the material with the quality problem, thus improving the safety control of materials and products. In addition, this solution realizes automatic monitoring of materials being fed, providing a fool-proof means for material feeding control.

In some embodiments, the method further includes: under a condition that the verification information of the material being fed is determined to be different from the verification information of the historical feeds, generating an operation signal; where the operation signal includes a signal for controlling the device end to initiate a suction operation. In this solution, under a condition that the verification information of the material being fed is determined to be different from the verification information of the historical feeds, a computing device can directly generate the operation signal for controlling the device end to initiate a suction operation, so that the device end can complete feeding of the material being fed, thus improving the material feeding rate.

In some embodiments, the method further includes: under a condition that the verification information of the material being fed is determined to be different from the verification information of the historical feeds and a material code of the material being fed is determined to be different from a material code of a desired material, generating a second abnormal operation signal; where the second abnormal operation signal includes a second alarm signal and/or a signal for controlling the device end to stop a suction operation. In addition to comparing the verification information of the material being fed with the verification information of the historical feeds, this solution also compares the material code of the material being fed with the material code of the currently desired material. Under a condition that the verification information of the material being fed is determined to be different from the verification information of the historical feeds and the material code of the material being fed is determined to be different from the material code of the desired material, the computing device generates the second abnormal operation signal, and then based on the second abnormal operation signal, generates a material inconsistency alarm and/or controls the device end to stop suction of the material being fed. This avoids feeding an undesired material, thereby preventing materials from being mistakenly fed and improving the accuracy of material feeding.

In some embodiments, the method further includes: under a condition that the verification information of the material being fed is determined to be different from the verification information of the historical feeds and a material code of the material being fed is determined to be identical to a material code of a desired material, generating an operation signal; where the operation signal includes a signal for controlling the device end to initiate a suction operation. In addition to comparing the verification information of the material being fed with the verification information of the historical feeds, this solution also compares the material code of the material being fed with the material code of the currently desired material. Under a condition that the verification information of the material being fed is determined to be different from the verification information of the historical feeds and the material code of the material being fed is determined to be identical to the material code of the desired material, the computing device generates the operation signal for controlling the device end to initiate a suction operation, achieving material feeding under the condition that no verification information is duplicate and the material being fed is consistent with the desired material, thereby improving the accuracy of material feeding.

In some embodiments, after the generating an operation signal, the method further includes: sending the operation signal to the device end to control the device end to perform a suction operation on the material being fed; receiving a suction completion signal returned by the device end; and generating and sending a first control signal to the device end to control the device end to stop the suction operation, according to the suction completion signal. After controlling the device end to complete the suction of the material being fed based on the operation signal, this solution can generate the first control signal based on the suction completion signal returned from the device end, so as to control the device end to stop the suction operation in a timely manner, thereby improving the accuracy of suction and stoppage.

In some embodiments, after the generating and sending a first control signal to the device end, according to the suction completion signal, the method further includes: obtaining verification information of a next material being fed in main materials; under a condition that the verification information of the next material being fed is determined to be different from the verification information of the historical feeds, regenerating and resending the operation signal to the device end to control the device end to perform a suction operation on the next material being fed; where the main materials include multiple packages of materials being fed, the multiple packages of materials being fed all having verification information. In the embodiments of this application, in a situation where main materials of multiple packages of materials need to be fed, it is necessary to perform verification information repetition detection for each package of materials being fed in the main materials to achieve separate feeding assembly of each package of materials being fed.

In some embodiments, before the obtaining verification information of a next material being fed in main materials, the method further includes: obtaining a remaining demand quantity, where the remaining demand quantity is obtained by calculating a difference between a total demand quantity of main materials and a quantity of materials already sucked by the device end; and under a condition that the remaining demand quantity is determined to be greater than or equal to a preset value, performing the step of obtaining verification information of a next material being fed in main materials; or under a condition that the remaining demand quantity is determined to be less than a preset value, generating a second control signal and sending the second control signal to the device end to control the device end to stop the suction operation. In this implementation, before feeding the next material being fed in the main materials, it is necessary to further determine a demand quantity of the main material, to avoid overfeeding or underfeeding the main material, thereby improving the accuracy of material feeding.

In some embodiments, the operation signal further includes a preset duration operation signal; where the preset duration operation signal is used to control the device end to perform a suction operation for a preset duration on the material being fed. In the embodiments of this application, the preset duration is added to the operation signal, so that the device end performs a suction operation for the preset duration on the material being fed, precisely controlling the suction duration of the device end.

In some embodiments, the determining that the verification information of the material being fed is identical to verification information of historical feeds includes: searching a historical feed database based on the verification information of the material being fed; and under a condition that historical verification information identical to the verification information of the material being fed is found in the database, determining that the verification information of the material being fed is identical to the verification information of the historical feeds.

In some embodiments, the method further includes: storing the verification information of the material being fed into the historical feed database. In this implementation, verification information of each material feeding is stored in the database, then the historical feed database is searched for the verification information of the material being fed, and under a condition that historical verification information identical to the verification information of the material being fed is found in the database, the verification information of the material being fed is determined to be identical to the verification information of the historical feeds. Therefore, database storage simplifies the comparison between the verification information of the material being fed and the verification information of the historical feeds. Additionally, this solution stores the verification information of the material being fed into the historical feed database, so as to update verification information in the database.

In some embodiments, the first abnormal operation signal further includes a signal for controlling the device end to perform a lockout, and the method further includes: sending the first abnormal operation signal to the device end to control the device end to perform a lockout operation; obtaining an unlock input request initiated based on a user operation instruction; and under a condition that the user is determined to not have unlock permission based on currently logged-in user identity information, generating permission restriction prompt information.

In some embodiments, the method further includes: under a condition that the user is determined to have an unlock permission based on the currently logged-in user identity information, generating and displaying an unlock input screen; obtaining and verifying unlock verification information entered; under a condition that verification of the unlock verification information is determined to be successful, generating an unlock signal based on the unlock verification information; and sending the unlock signal to the device end to control the device end to perform an unlock operation. It is designed in this implementation that firstly the device end performs a lockout in case of duplicate verification information or inconsistency between the material being fed and the desired material, and an identity permission restriction is set for unlock input, thus preventing the staff from misoperation to cause material quality problems and facilitating traceability.

In some embodiments, the obtaining verification information of a material being fed includes: receiving the verification information of the material being fed sent by the device end; where the verification information of the material being fed is obtained by the device end by identifying a verification identifier of the material being fed.

In some embodiments, the verification identifier includes a quick response code, a barcode, and a radio frequency tag.

According to a second aspect, this application provides a material feeding control apparatus, where the apparatus includes an obtaining module and a generating module. The obtaining module is configured to obtain verification information of a material being fed, and the generating module is configured to generate a first abnormal operation signal under a condition that the verification information of the material being fed is determined to be identical to verification information of historical feeds, where the first abnormal operation signal includes a first alarm signal and/or a signal for controlling a device end to stop an operation.

In the technical solutions of embodiments of this application, this solution first obtains the verification information of the material being fed; then compares the verification information of the material being fed with the verification information of the historical feeds; under a condition that the verification information of the material being fed is determined to be identical to the verification information of the historical feeds, generates the first abnormal operation signal; and based on the first abnormal operation signal, generates an alarm and/or controls the device end to stop suction of the material being fed. In comparison with the existing verification method of scanning material codes in which only a verification code is compared with a material code of a desired material, this solution does not feed a material with duplicate verification information detected during the material feeding process to ensure that each fed material has its unique verification information. In this way, when a quality problem is found among materials that have been fed, a material with the quality problem can be traced based on verification information of the material with the quality problem, thus improving the safety control of materials and products. In addition, this solution realizes automatic monitoring of materials being fed, providing a fool-proof means for material feeding control.

In some embodiments, the generating module is further configured to generate an operation signal under a condition that the verification information of the material being fed is determined to be different from the verification information of the historical feeds, where the operation signal includes a signal for controlling the device end to initiate a suction operation.

In some embodiments, the generating module is further configured to generate a second abnormal operation signal under a condition that the verification information of the material being fed is determined to be different from the verification information of the historical feeds and a material code of the material being fed is determined to be different from a material code of a desired material, where the second abnormal operation signal includes a second alarm signal and/or a signal for controlling the device end to stop a suction operation.

In some embodiments, the generating module is further configured to generate an operation signal under a condition that the verification information of the material being fed is determined to be different from the verification information of the historical feeds and a material code of the material being fed is determined to be identical to a material code of a desired material, where the operation signal includes a signal for controlling the device end to initiate a suction operation.

In some embodiments, the apparatus further includes: a sending module configured to send the operation signal to the device end to control the device end to perform a suction operation on the material being fed; a receiving module configured to receive a suction completion signal returned by the device end; and a generating module configured to generate and send a first control signal to the device end to control the device end to stop the suction operation, according to the suction completion signal.

In some embodiments, the obtaining module is further configured to obtain verification information of a next material being fed in main materials; and the generating module is further configured to: under a condition that the verification information of the next material being fed is determined to be different from the verification information of the historical feeds, regenerate and resend the operation signal to the device end to control the device end to perform a suction operation on the next material being fed; where the main materials include multiple packages of materials being fed, the multiple packages of materials being fed all having verification information.

In some embodiments, the obtaining module is further configured to obtain a remaining demand quantity, where the remaining demand quantity is obtained by calculating a difference between a total demand quantity of main materials and a quantity of materials already sucked by the device end; and an execution module is configured to: under a condition that the remaining demand quantity is determined to be greater than or equal to a preset value, perform the step of obtaining verification information of a next material being fed in main materials; the generating module is further configured to generate a second control signal under a condition that the remaining demand quantity is determined to be less than a preset value; and the sending module is configured to send the second control signal to the device end to control the device end to stop the suction operation.

In some embodiments, the apparatus further includes a determining module configured to search a historical feed database based on the verification information of the material being fed; and under a condition that historical verification information identical to the verification information of the material being fed is found in the database, determine that the verification information of the material being fed is identical to the verification information of the historical feeds.

In some embodiments, the apparatus further includes a storage module configured to store the verification information of the material being fed into the historical feed database.

In some embodiments, the first abnormal operation signal further includes a signal for controlling the device end to perform a lockout, the sending module is further configured to send the first abnormal operation signal to the device end to control the device end to perform a lockout operation, the obtaining module is further configured to obtain an unlock input request initiated according to a user operation instruction; and the generating module is further configured to generate permission restriction prompt information under a condition that the user is determined to not have an unlock permission based on currently logged-in user identity information.

In some embodiments, the generating module is further configured to generate and display an unlock input screen under a condition that the user is determined to have an unlock permission based on the currently logged-in user identity information; the obtaining module is further configured to obtain and verify unlock verification information entered; the generating module is further configured to generate an unlock signal based on the unlock verification information under a condition that verification of the unlock verification information is determined to be successful; and the sending module is further configured to send the unlock signal to the device end to control the device end to perform an unlock operation.

In some embodiments, the obtaining module is specifically configured to obtain the verification information of the material being fed, including: receiving the verification information of the material being fed sent by the device end; where the verification information of the material being fed is obtained by the device end by identifying a verification identifier of the material being fed.

According to a third aspect, this application provides an electronic device including a memory and a processor. The memory stores a computer program, and when the processor executes the computer program, the method according to the first aspect or any one of the optional implementations of the first aspect is implemented.

According to a fourth aspect, this application provides a computer readable storage medium. The computer readable storage medium stores a computer program, and when the computer program is executed by a processor, the method according to the first aspect or any one of the optional implementations of the first aspect is implemented.

According to a fifth aspect, this application provides a computer program product. When the computer program product runs on a computer, the method according to the first aspect or any one of the optional implementations of the first aspect is implemented by the computer.

The foregoing description is merely an overview of the technical solution of this application. For a better understanding of the technical means in this application such that they can be implemented according to the content of the specification, and to make the above and other objectives, features and advantages of this application more obvious and easier to understand, the following describes specific embodiments of this application.

BRIEF DESCRIPTION OF DRAWINGS

Persons of ordinary skill in the art can clearly understand various other advantages and benefits by reading the detailed description of the preferred embodiments below. The accompanying drawings are merely intended to illustrate the preferred embodiments and are not intended to limit this application. In addition, in all the accompanying drawings, same parts are denoted by same reference signs. In the accompanying drawings.

Figure 1:
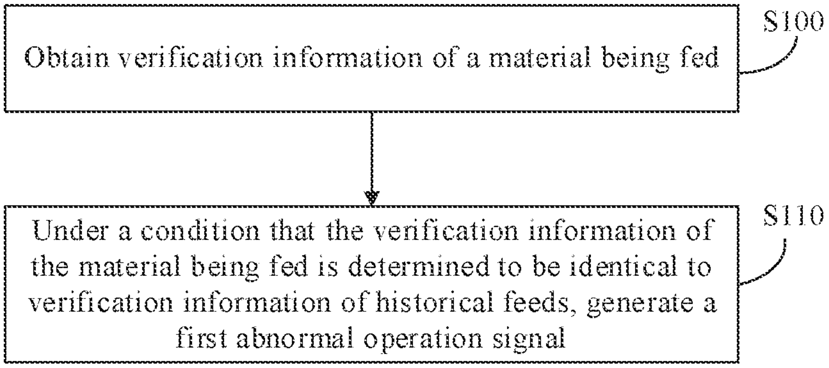
FIG. 1 is a first schematic flowchart of a material feeding control method according to this application.

Reference signs in the embodiments are as follows:

800. obtaining module; 810. generating module; 820. sending module; 830. receiving module; 840. execution module; 850. determining module; 860. storage module; 9. electronic device; 901. processor; 902. memory; and 903. communication bus.

DESCRIPTION OF EMBODIMENTS

The following describes in detail the embodiments of technical solutions of this application with reference to the accompanying drawings. The following embodiments are merely intended for a clearer description of the technical solutions of this application and therefore are used as just examples which do not constitute any limitations on the protection scope of this application.

Unless otherwise defined, all technical and scientific terms used herein shall have the same meanings as commonly understood by those skilled in the art to which this application relates. The terms used herein are intended to merely describe the specific embodiments rather than to limit this application. The terms "include", "comprise", and "have" and any other variations thereof in the specification, claims and brief description of drawings of this application are intended to cover non-exclusive inclusions.

In the description of the embodiments of this application, the terms "first", "second", and the like are merely intended to distinguish between different objects, and shall not be understood as any indication or implication of relative importance or any implicit indication of the number, sequence or primary-secondary relationship of the technical features indicated. In the description of the embodiments of this application, "a plurality of" means at least two unless otherwise specifically stated.

In this specification, reference to "embodiment" means that specific features, structures or characteristics described with reference to the embodiment may be incorporated in at least one embodiment of this application. The word "embodiment" appearing in various places in the specification does not necessarily refer to the same embodiment or an independent or alternative embodiment that is exclusive of other embodiments. It is explicitly or implicitly understood by persons skilled in the art that the embodiments described herein may be combined with other embodiments.

In the description of the embodiments of this application, the term "and/or" is only an associative relationship for describing associated objects, indicating that three relationships may be present. For example, A and/or B may indicate the following three cases: presence of only A, presence of both A and B, and presence of only B. In addition, the character "/" in this specification generally indicates an "or" relationship between contextually associated objects.

In the description of the embodiments of this application, the term "a plurality of" means more than two (inclusive). Similarly, "a plurality of groups" means more than two (inclusive) groups, and "a plurality of pieces" means more than two (inclusive) pieces.

In the description of the embodiments of this application, the orientations or positional relationships indicated by the technical terms "center", "longitudinal", "transverse", "length", "width", "thickness", "upper", "lower", "front", "rear", "left", "right", "perpendicular", "horizontal", "top", "bottom", "inside", "outside", "clockwise", "counterclockwise", "axial", "radial", "circumferential", and the like are based on the orientations or positional relationships as shown in the accompanying drawings. These terms are merely for ease and brevity of description of the embodiments of this application rather than indicating or implying that the apparatuses or components mentioned must have specific orientations or must be constructed or manipulated according to specific orientations, and therefore shall not be construed as any limitations on embodiments of this application.

In the description of the embodiments of this application, unless otherwise specified and defined explicitly, the terms "mount", "connect", "join", and "fasten" should be understood in their general senses. For example, they may refer to a fixed connection, a detachable connection, or an integral connection, may refer to a mechanical connection or electrical connection, and may refer to a direct connection, an indirect connection via an intermediate medium, or communication between two elements or an interaction between two elements. Persons of ordinary skill in the art can understand specific meanings of these terms in this application as appropriate to specific situations.

According to some embodiments of this application, embodiments of this application provide a material feeding control method. The method may be performed by a computing device, and the computing device includes but is not limited to a server, a computer, an upper computer, a controller, and a chip. As shown in FIG. 1, the material feeding control method may be implemented in the following manner, including step S100 and step S110.

Step S100. Obtain verification information of a material being fed.

Step S110. Under a condition that the verification information of the material being fed is determined to be identical to verification information of historical feeds, generate a first abnormal operation signal.

In the above implementation, material feeding is required in the product processing and production process, an identifier of the material being fed identifies a material that needs to be fed currently. It is designed in this solution that each material being fed has verification information, and the verification information can contain information on some related characteristics of the material, including but not limited to the material name, material unique identifier, material weight, and so on.

The verification information can be obtained by the device end by identifying a verification identifier of the material being fed. A computing device can communicate with the device end, and the computing device can obtain the verification information of the material being fed by interacting with the device end. For example, the verification identifier may include a quick response code, a barcode, a radio frequency tag, and the like. Matching may be correspondingly performed between a configuration of the device end and a verification identifier provided. For example, under a condition that the verification identifier is a quick response code, the device end may include an accessory that can recognize quick response codes, including but not limited to a camera, a smart identification device, and the like. For another example, under a condition that the verification identifier is a barcode, the device end may include an accessory that can recognize barcodes, including but not limited to a scanning gun or the like.

Specifically, in a possible implementation, the verification identifier can be provided on a material package of the material being fed; and in another possible implementation, different materials being fed are stored in different locations, and the verification identifier may alternatively be provided on a storage location of the material being fed.

Before the material being fed is fed, the computing device can compare the obtained information of the material being fed with verification information of historical feeds. Under a condition that the verification information of the material being fed is determined to be identical to one or more pieces of verification information of the historical feeds, it means that the verification information of the material being fed is duplicated, and in the case of verification information duplication, the computing device generates the first abnormal operation signal.

In a possible implementation, the first abnormal operation signal may be a first alarm signal. The first alarm signal may be used to alert the staff of a current feeding error. Furthermore, the first alarm signal may also be used to alert the staff of a verification duplication error for the material being fed.

In another possible implementation, the first abnormal operation signal may alternatively be a signal to control the device end to stop the suction operation, and based on the signal, the device end can be controlled to stop suction of the material being fed, so as to avoid feeding the material being fed with duplicate verification information. In this case, the device end may further contain an accessory configured to perform a suction operation on the material being fed so as to achieve material feeding, for example, a suction machine.

In another possible implementation, the first abnormal operation signal may also contain the first alarm signal besides the signal for controlling the device end to stop the suction operation. Therefore, under a condition that the material being fed has duplicated verification information, an alarm is generated in addition to controlling the device end to stop the suction operation. In this way, on a basis of avoiding feeding the material being fed with the duplicated verification information, alarm information is generated to prompt the staff of verification duplication, thus improving the timeliness of the error repair.

According to the above material feeding control design, this solution first obtains the verification information of the material being fed; then compares the verification information of the material being fed with the verification information of the historical feeds; under a condition that the verification information of the material being fed is determined to be identical to the verification information of the historical feeds, generates the first abnormal operation signal; and based on the first abnormal operation signal, generates an alarm and/or controls the device end to stop suction of the material being fed. In comparison with the existing verification method of scanning material codes in which only a verification code is compared with a material code of a desired material, this solution does not feed a material with duplicate verification information detected during the material feeding process to ensure that each fed material has its unique verification information. In this way, when a quality problem is found among materials that have been fed, a material with the quality problem can be traced based on verification information of the material with the quality problem, thus improving the safety control of materials and products. In addition, this solution realizes automatic monitoring of materials being fed, providing a fool-proof means for material feeding control.

Figure 2:
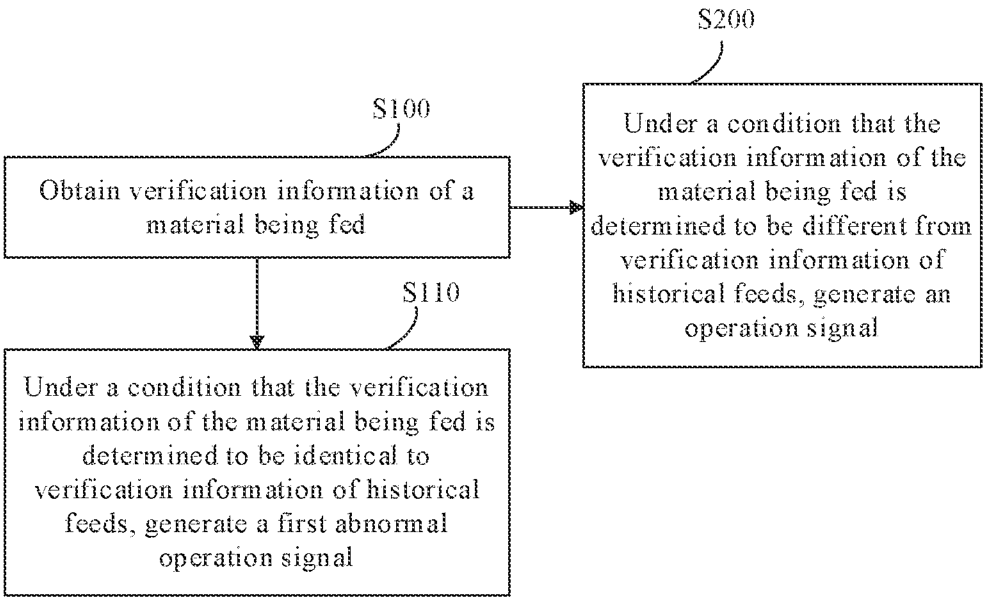
FIG. 2 is a second schematic flowchart of a material feeding control method according to this application.

In a possible implementation, on a basis of the previous description about the computing device comparing the verification information of the material being fed and the verification information of the historical feeds, refer to step 200 shown in FIG. 2. Under a condition that the computing device determines that the verification information of the material being fed is different from the verification information of the historical feeds, that is, the verification information of the material being fed is not duplicated with any of the verification information of historical feeds, the computing device generates the operation signal, which may include a signal for controlling the device end to initiate the suction operation, and then sends the operation signal to the device end to make the device end perform a suction operation on the material being fed to complete the feeding of the material being fed.

In this solution, under a condition that the verification information of the material being fed is determined to be different from the verification information of the historical feeds, the computing device can directly generate the operation signal to control the device end to initiate a suction operation, so that the device end can complete feeding of the material being fed, thus improving the material feeding rate.

Figure 3:
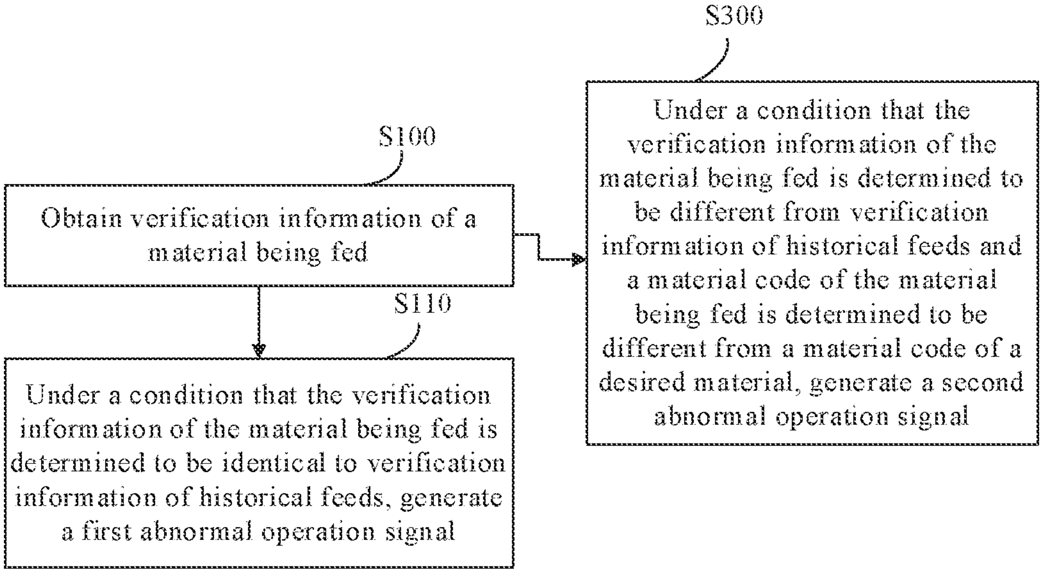
FIG. 3 is a third schematic flowchart of a material feeding control method according to this application.

In another possible implementation, refer to step S300 shown in FIG. 3. In addition to comparing the verification information of the material being fed with the verification information of the historical feeds, the computing device further compares the material code of the material being fed with a material code of a currently desired material. Under a condition that the computing device determines that the verification information of the material being fed is different from the verification information of the historical feeds and the material code of the material being fed is different from the material code of the desired material, it means that the material being fed is not consistent with the desired material although the material being fed is not duplicated with the historical feeds. Based on this, the computing device generates a second abnormal operation signal.

In a possible example, the second abnormal operation signal can be a second alarm signal. The second alarm signal may be used to alert the staff of a current feeding error, and based on this, the second alarm signal and the first alarm signal may be a same signal, and certainly, may alternatively be different signals. Further, the second alarm signal may also be used to alert the staff of an error of inconsistent codes during current feeding. Based on this, the second alarm signal and the first alarm signal are two different alarm signals.

In another possible example, the second abnormal operation signal may alternatively be a signal for controlling the device end to stop the suction operation. Based on the signal, the device end can be controlled to stop suction of the material being fed to prevent feeding the material being fed in a case of code inconsistency. Based on this, under a condition that the first abnormal operation signal is also the signal for controlling the device end to stop the suction operation, the first abnormal signal and the second abnormal signal may be the same signal.

In another possible example, the second abnormal operation signal may also contain a second alarm signal in addition to the signal for controlling the device end to stop the suction operation, so that under a condition that the material code of the material being fed is different from the material code of the desired material, an alarm is also generated in addition to controlling the device end to stop the suction operation, thus preventing feeding the material being fed that is not desired. In this way, under a condition that the material being fed is not the desired material, alarm information is generated to prompt the staff that the material being fed is inconsistent with the desired material, thus improving the timeliness of the error repair.

In addition to comparing the verification information of the material being fed with the verification information of the historical feeds, this solution also compares the material code of the material being fed with the material code of the currently desired material. Under a condition that the verification information of the material being fed is determined to be different from the verification information of the historical feeds and the material code of the material being fed is determined to be different from the material code of the desired material, the computing device generates the second abnormal operation signal, and then based on the second abnormal operation signal, generates a material inconsistency alarm and/or controls the device end to stop suction of the material being fed. This avoids feeding an undesired material, thereby preventing materials from being mistakenly fed and improving the accuracy of material feeding.

Figure 4:
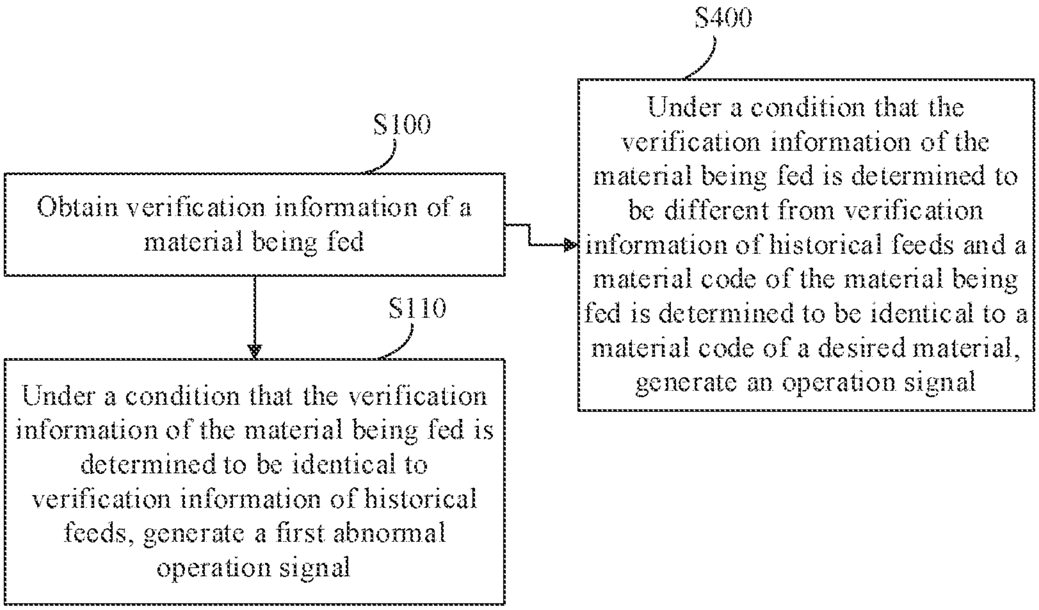
FIG. 4 is a fourth schematic flowchart of a material feeding control method according to this application.

In another possible implementation, refer to step S400 shown in FIG. 4. In addition to comparing the verification information of the material being fed with the verification information of the historical feeds, the computing device further compares the material code of the material being fed with the material code of the currently desired material. Under a condition that the computing device determines that the verification information of the material being fed is different from the verification information of the historical feeds and the material code of the material being fed is the same as the material code of the desired material, it means that the material being fed meets the requirement of non-duplication and being the current desired material, and the computing device generates the operation signal, so as to control the device end to start the suction operation based on the operation signal, so as to complete the suction of the material being fed.

In addition to comparing the verification information of the material being fed with the verification information of the historical feeds, this solution also compares the material code of the material being fed with the material code of the currently desired material. Under a condition that the verification information of the material being fed is determined to be different from the verification information of the historical feeds and the material code of the material being fed is determined to be identical to the material code of the desired material, the computing device generates the operation signal for controlling the device end to initiate a suction operation, achieving material feeding under the condition that no verification information is duplicate and the material being fed is consistent with the desired material, thereby improving the accuracy of material feeding.

Figure 5:
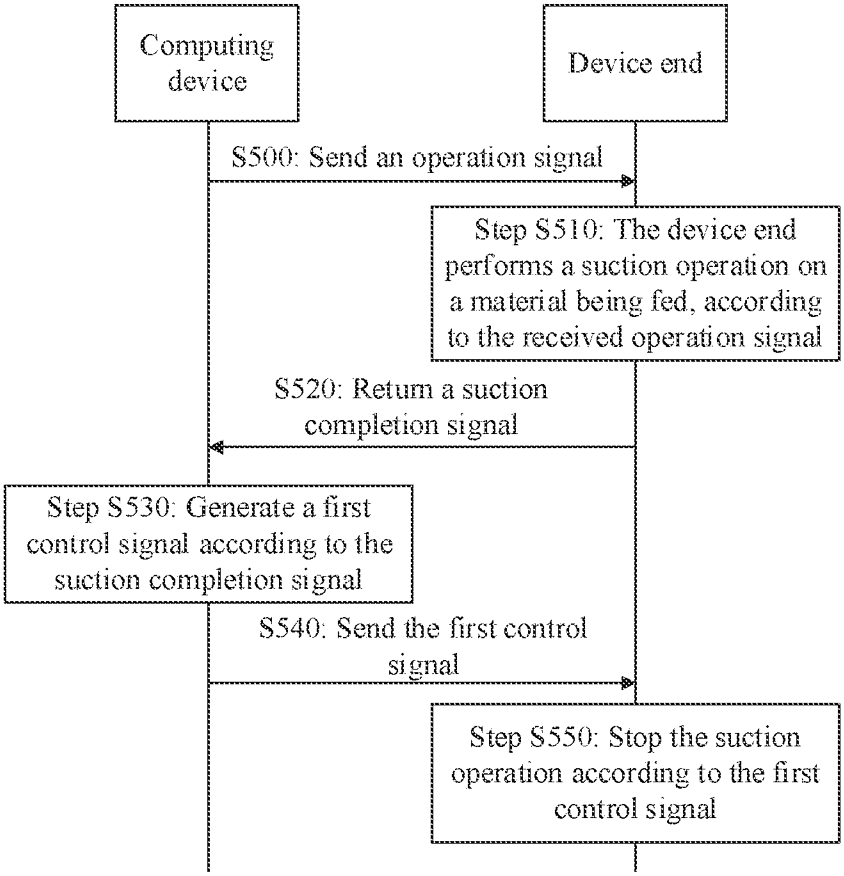
FIG. 5 is a fifth schematic flowchart of a material feeding control method according to this application.

As previously described, the computing device may communicate and interact with the device end. On this basis, refer to steps S500 to S550 of FIG. 5. After generating the operation signal, the computing device may send the generated operation signal to the device end; the device end performs the suction operation on the material being fed, according to the received operation signal; after the device end completes the suction of the material being fed, the device end may return a suction completion signal to the computing device; and according to the suction completion signal of the device end, the computing device may generate and send the first control signal to the device end; and the device end stops the suction operation after receiving the first control signal, so as to pause/end the suction operation of the device end.

After controlling the device end to complete the suction of the material being fed based on the operation signal, this solution can generate the first control signal based on the suction completion signal returned from the device end, so as to control the device end to stop the suction operation in a timely manner, thereby improving the accuracy of suction and stoppage.

Figure 6:
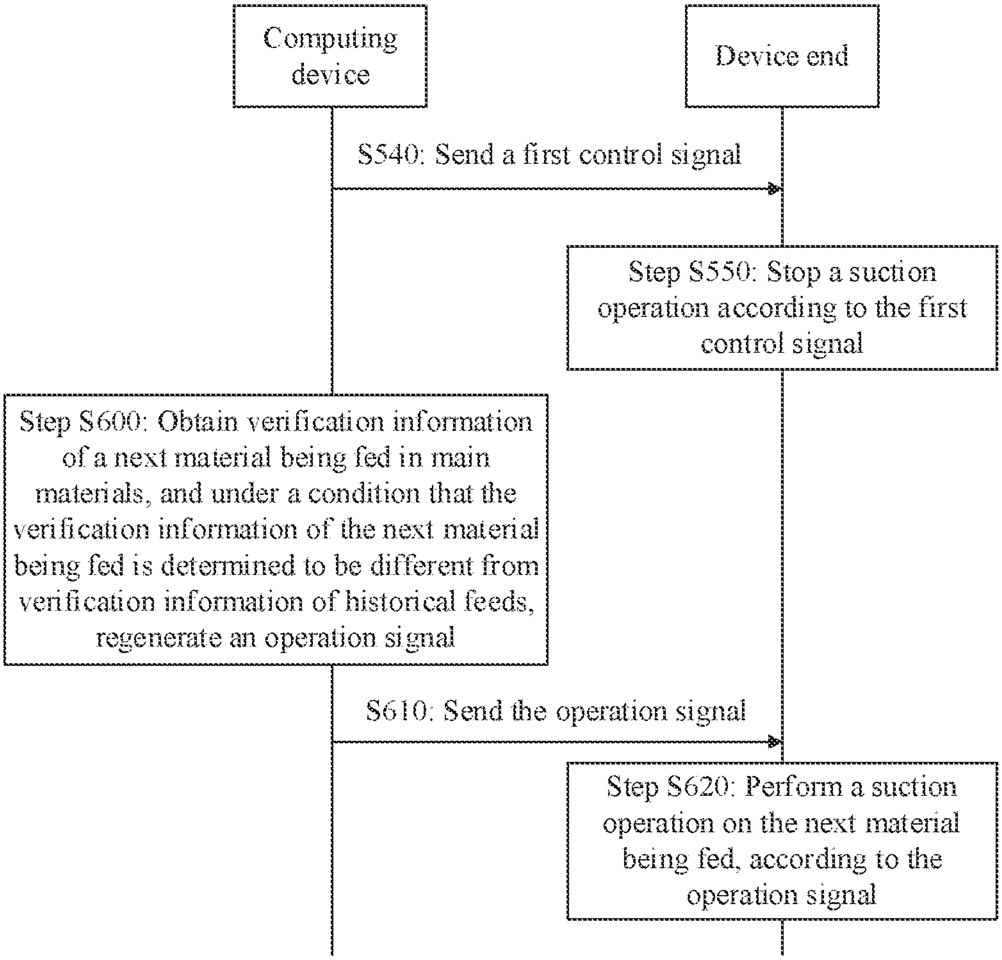
FIG. 6 is a sixth schematic flowchart of a material feeding control method according to this application.

In a possible implementation, the material being fed in this solution may include main materials, and the main materials include multiple packages of materials being fed, where each package of materials being fed has verification information. For example, the main materials generally include three or four packages of materials being fed. On this basis, refer to steps S600 to S620 shown in FIG. 6. After sending the first control signal to the device end, the computing device may further obtain verification information of a next material being fed in the main materials, and continue to compare the verification information of the next material being fed with the verification information of the historical feeds; and under a condition that the computing device determines that the verification information of the next material being fed is different from the verification information of the historical feeds, the computing device regenerates and resends an operation signal to the device end, so that the device end performs a suction operation on the next material being fed according to the operation signal.

In the embodiments of this application, in a situation where main materials of multiple packages of materials need to be fed, it is necessary to perform verification information repetition detection for each package of materials being fed in the main materials to achieve separate feeding assembly of each package of materials being fed.

According to some embodiments of this application, before obtaining the verification information of the next material being fed in the main materials, this solution can further obtain the remaining demand quantity. The remaining demand quantity is obtained by calculating a difference between a total demand quantity of main materials and a quantity of main materials already sucked by the device end.

Figure 7:
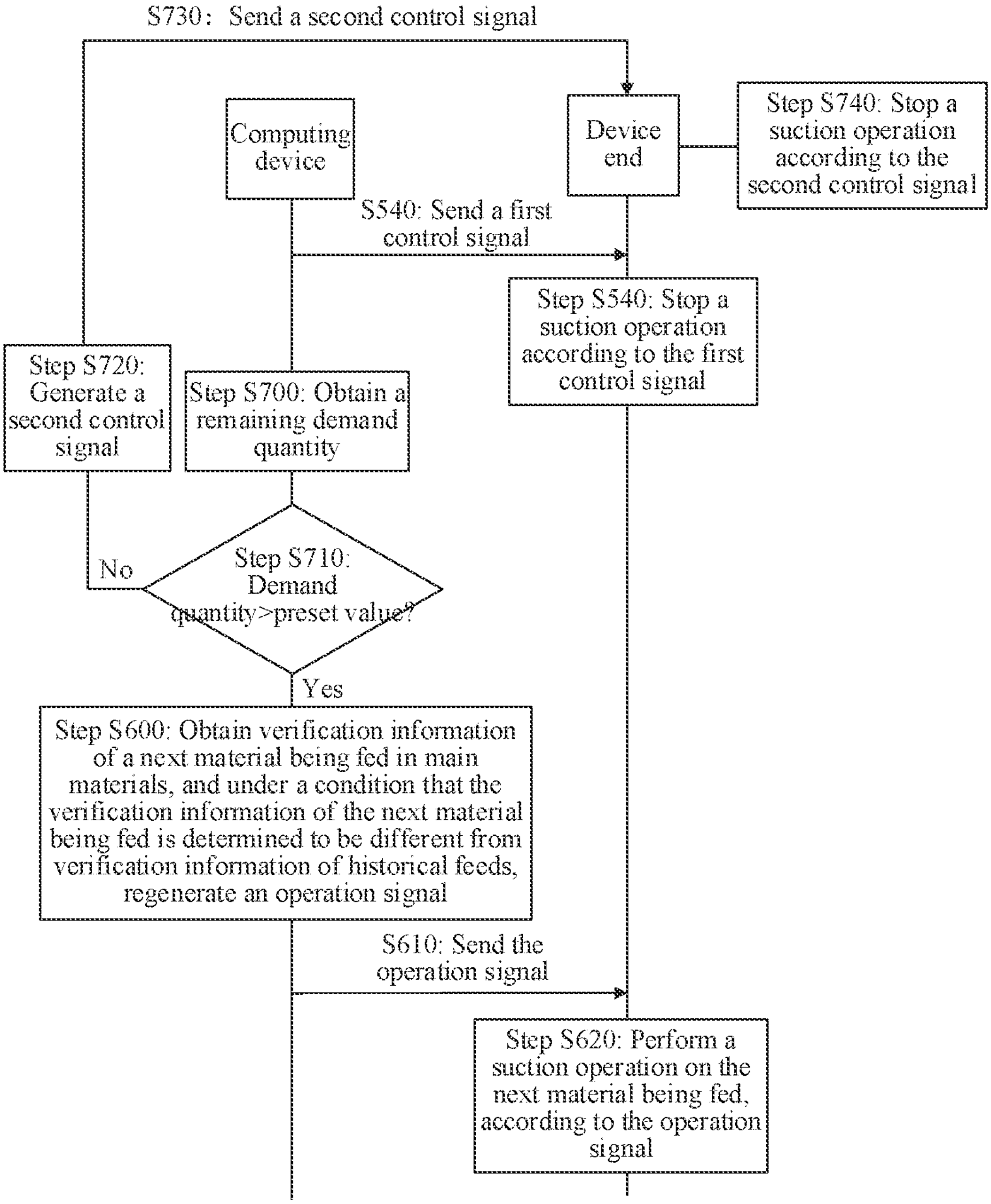
FIG. 7 is a seventh schematic flowchart of a material feeding control method according to this application.

Referring to steps S700 to S710 shown in FIG. 7, after calculating the remaining demand quantity, the computing device may compare the remaining demand quantity with a preset value. Under a condition that the computing device determines that the remaining demand quantity is greater than or equal to the preset value, it means that there is still a need to continue feeding the main material of that type, and on this basis, the computing device obtains verification information of a next material being fed in the main materials; or under a condition that the computing device determines that the remaining demand quantity is less than the preset value, it means that the demand for this type of main material is satisfied, and on this basis, this solution can generate a second control signal and send the second control signal to the device end, so that the device end stops the suction operation according to the second control signal, thus stopping suction of this main material.

In this implementation, before feeding the next material being fed in the main materials, it is necessary to further determine a demand quantity of the main material, to avoid overfeeding or underfeeding the main material, thereby improving the accuracy of material feeding.

According to some embodiments of this application, the operation signal described above may further include a preset duration. After the computing device sends the operation signal to the device end, the device end performs a suction operation on the material being fed for the preset duration according to the operation signal, thus controlling the suction duration of the device end. An amount of each feeding is generally a fixed value, and a suction amount per unit time of the device end is generally a fixed value. On this basis, this solution can determine the preset duration based on a ratio of the amount of each feeding and the suction amount per unit time of the device end.

In the embodiments of this application, the preset duration is added to the operation signal, so that the device end performs a suction operation for the preset duration on the material being fed, precisely controlling the suction duration of the device end.

According to some embodiments of this application, as described above, the computing device can compare the verification information of the material being fed with the verification information of the historical feeds. Specifically, this solution can store the verification information of each material fed into the database, and on this basis, the computing device can search the historical feed database according to the verification information of the material being fed, and if finding historical verification information same as the verification information of the material being fed in the database, the computing device determines that the verification information of the material being fed is identical to the verification information of the historical feeds.

In a possible implementation, the computing device may further store the verification information of the material being fed into the historical feed database. In a possible implementation, the computing device may store the verification information of the material being fed into the historical feed database after the feeding of the material being fed is completed. In this way, the verification information of the material being fed can be stored as well as the verification information in the database can be updated.

In this implementation, verification information of each material feeding is stored in the database, then the historical feed database is searched for the verification information of the material being fed, and under a condition that historical verification information identical to the verification information of the material being fed is found in the database, the verification information of the material being fed is determined to be identical to the verification information of the historical feeds. Therefore, database storage simplifies the comparison between the verification information of the material being fed and the verification information of the historical feeds. Additionally, this solution stores the verification information of the material being fed into the historical feed database, so as to update verification information in the database.

According to some embodiments of this solution, the first abnormal operation signal or the second abnormal operation signal described above may further include a signal for controlling the device end to perform a lockout, that is, the device end may perform a lockout in a case of duplication of the verification information or inconsistency between the material being fed and the desired material. After the device end is locked, the computing device may obtain an unlock input request initiated according to a user operation instruction and verifies currently logged-in user identity information. Under a condition that the computing device determines, based on the currently logged-in user identity information, that a user does not have an unlock permission, the computing device generates permission restriction prompt information, thereby prompting that the user does not have permission to unlock the device end. The computing device may include an operating system, and a user may initiate an unlock input request on the operating system.

Under a condition that determining, based on the currently logged-in user identity information, that the user has unlock permission, the computing device generates and displays an unlock input screen, where the unlock input screen is provided to the user to input unlock verification information. On this basis, the computing device obtains and verifies the inputted unlock verification information; under a condition that the computing device determines that verification of the unlock verification information is successful, the computing device generates an unlock signal based on the unlock verification information, and sends the unlock signal to the device end to control the device end to perform the unlock operation. Whether a user has an unlock permission can be determined by obtaining a rank of a currently logged-in user. If the rank of the currently logged-in user meets a preset rank requirement, it is determined that the user has an unlock permission.

It is designed in this implementation that firstly the device end performs a lockout in case of duplicate verification information or inconsistency between the material being fed and the desired material, and an identity permission restriction is set for unlock input, thus preventing the staff from misoperation to cause material quality problems and facilitating traceability.

Figure 8:
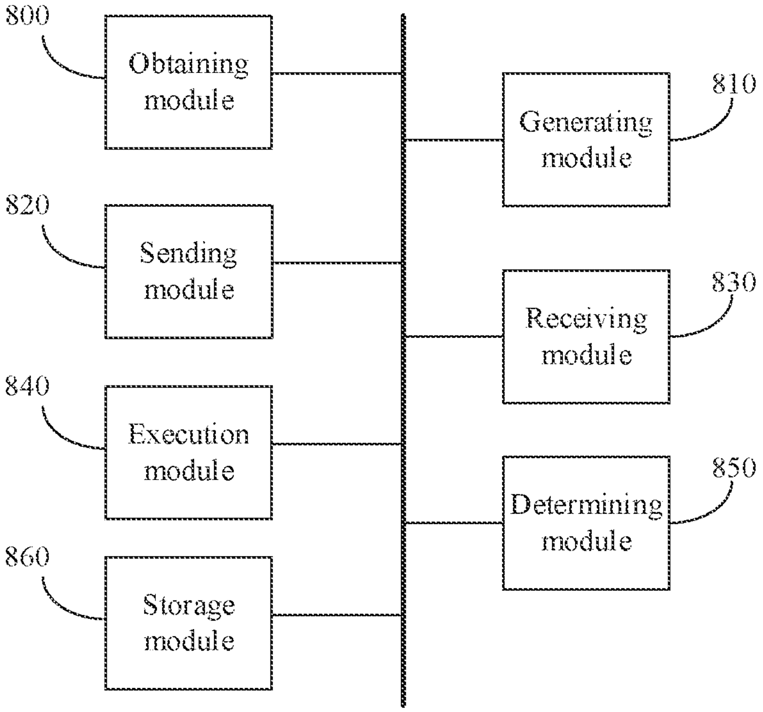
FIG. 8 is a structural schematic diagram of a material feeding control apparatus according to this application.

FIG. 8 is a schematic structural block diagram of a material feeding control apparatus according to this application. It should be understood that this apparatus corresponds to the method embodiments performed in FIGS. 1 to 7 and is capable of performing the steps in the foregoing method. For specific functions of the apparatus, refer to the description above, and a detailed description is appropriately omitted here to avoid repetition. The apparatus includes at least one software functional module that can be stored in a memory in a form of software or firmware (firmware) or embedded into an operating system (operating system, OS) of the apparatus. Specifically, the apparatus includes an obtaining module 800 and a generating module 810. The obtaining module 800 is configured to obtain verification information of a material being fed; and the generating module 810 is configured to generate a first abnormal operation signal under a condition that the verification information of the material being fed is determined to be identical to verification information of historical feeds, where the first abnormal operation signal includes a first alarm signal and/or a signal for controlling a device end to stop an operation.

In the technical solutions of embodiments of this application, this solution first obtains the verification information of the material being fed; then compares the verification information of the material being fed with the verification information of the historical feeds; under a condition that the verification information of the material being fed is determined to be identical to the verification information of the historical feeds, generates the first abnormal operation signal; and based on the first abnormal operation signal, generates an alarm and/or controls the device end to stop suction of the material being fed. In comparison with the existing verification method of scanning material codes in which only a verification code is compared with a material code of a desired material, this solution does not feed a material with duplicate verification information detected during the material feeding process to ensure that each fed material has its unique verification information. In this way, when a quality problem is found among materials that have been fed, a material with the quality problem can be traced based on verification information of the material with the quality problem, thus improving the safety control of materials and products. In addition, this solution realizes automatic monitoring of materials being fed, providing a fool-proof means for material feeding control.

According to some embodiments of this application, optionally, the generating module 810 is further configured to generate an operation signal under a condition that the verification information of the material being fed is determined to be different from the verification information of the historical feeds. The operation signal includes a signal for controlling the device end to initiate a suction operation.

According to some embodiments of this application, optionally, the generating module 810 is further configured to generate a second abnormal operation signal under a condition that the verification information of the material being fed is determined to be different from the verification information of the historical feeds and a material code of the material being fed is determined to be different from a material code of a desired material. The second abnormal operation signal includes a second alarm signal and/or a signal for controlling the device end to stop a suction operation.

According to some embodiments of this application, optionally, the generating module 810 is further configured to generate an operation signal under a condition that the verification information of the material being fed is determined to be different from the verification information of the historical feeds and a material code of the material being fed is determined to be identical to a material code of a desired material. The operation signal includes a signal for controlling the device end to initiate a suction operation.

According to some embodiments of this application, optionally, the apparatus further includes: a sending module 820 configured to send the operation signal to the device end to control the device end to perform a suction operation on the material being fed; a receiving module 830 configured to receive a suction completion signal returned by the device end; and the generating module 810 further configured to generate and send a first control signal to the device end to control the device end to stop the suction operation, according to the suction completion signal.

According to some embodiments of this application, optionally, the obtaining module 800 is further configured to obtain verification information of a next material being fed in main materials; and under a condition that the verification information of the next material being fed is determined to be different from the verification information of the historical feeds, the generating module 810 is further configured to regenerate and resend the operation signal to the device end to control the device end to perform a suction operation on the next material being fed. The main materials include multiple packages of materials being fed, and the multiple packages of materials being fed all have verification information.

According to some embodiments of this application, optionally, the obtaining module 800 is further configured to obtain a remaining demand quantity, where the remaining demand quantity is obtained by calculating a difference between a total demand quantity of main materials and a quantity of materials already sucked by the device end; an execution module 840 is configured to perform the step of obtaining verification information of a next material being fed in main materials, under a condition that the remaining demand quantity is determined to be greater than or equal to a preset value; the generating module 810 is further configured to generate a second control signal under a condition that the remaining demand quantity is determined to be less than a preset value; and the sending module 820 is further configured to send the second control signal to the device end to control the device end to stop the suction operation.

In some embodiments, optionally, the apparatus further includes a determining module 850 configured to search a historical feed database based on the verification information of the material being fed; and under a condition that historical verification information identical to the verification information of the material being fed is found in the database, determine that the verification information of the material being fed is identical to the verification information of the historical feeds.

In some embodiments, optionally, the apparatus further includes a storage module 860 configured to store the verification information of the material being fed into the historical feed database.

In some embodiments, optionally, the first abnormal operation signal further includes a signal for controlling the device end to perform a lockout; the sending module 820 is further configured to send the first abnormal operation signal to the device end to control the device end to perform a lockout operation; the obtaining module 800 is further configured to obtain an unlock input request initiated according to a user operation instruction; and the generating module 810 is further configured to generate permission restriction prompt information under a condition that the user is determined to not have an unlock permission based on currently logged-in user identity information.

In some embodiments, optionally, the generating module 810 is further configured to generate and display an unlock input screen under a condition that the user is determined to have an unlock permission based on the currently logged-in user identity information; the obtaining module 800 is further configured to obtain and verify unlock verification information entered; the generating module 810 is further configured to generate an unlock signal based on the unlock verification information under a condition that verification of the unlock verification information is determined to be successful; and the sending module 820 is further configured to send the unlock signal to the device end to control the device end to perform an unlock operation.

In some embodiments, optionally, the obtaining module 800 being specifically configured to obtain verification information of a material being fed includes receiving the verification information of the material being fed sent by the device end. The verification information of the material being fed is obtained by the device end by identifying a verification identifier of the material being fed.

Figure 9:
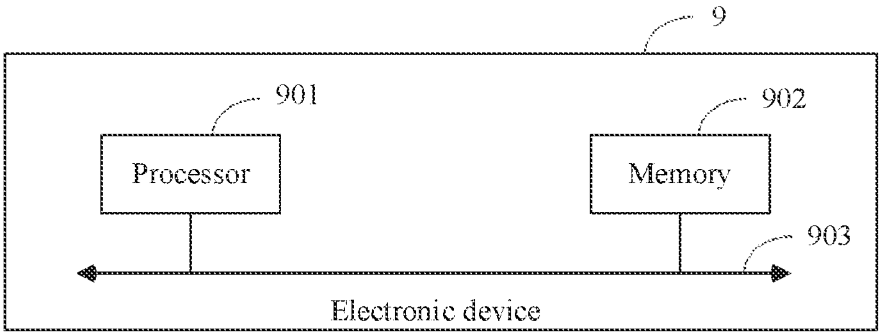
FIG. 9 is a schematic structural diagram of an electronic device according to this application.

According to some embodiments of this application, as shown in FIG. 9, this application provides an electronic device 9 including a processor 901 and a memory 902. The processor 901 and the memory 902 are interconnected and communicate with each other via a communication bus 903 and/or another form of connection mechanism (not shown). The memory 902 stores a computer program executable by the processor 901, and when a computing device runs, the processor 901 executes the computer program to execute the method executed by an external device according to any one of the optional implementations, for example, steps S100 to S110: obtaining verification information of a material being fed; and under a condition that the verification information of the material being fed is determined to be identical to verification information of historical feeds, generating a first abnormal operation signal.

This application provides a computer readable storage medium, the computer readable storage medium stores a computer program stored thereon, and when the computer program is executed by a processor, the method in any one of the foregoing optional implementations is implemented.

The storage medium may be implemented by any type of volatile or non-volatile storage device or a combination thereof, such as static random access memory (Static Random Access Memory, referred to as SRAM for short), electrically erasable programmable read-only memory (Electrically Erasable Programmable Read-Only Memory, referred to as EEPROM for short), erasable programmable read-only memory (Erasable Programmable Read Only Memory, referred to as EPROM for short), programmable read-only memory (Programmable Read-Only Memory, referred to as PROM for short), Read-Only Memory (Read-Only Memory, referred to as ROM for short), magnetic memory, flash memory, disk, or CD-ROM.

This application provides a computer program product, and when the computer program product runs on a computer, the computer is enabled to perform the method in any one of the optional implementations.

In conclusion, it should be noted that the foregoing embodiments are for description of the technical solutions of this application only rather than for limiting this application. Although this application has been described in detail with reference to the foregoing embodiments, persons of ordinary skill in the art should appreciate that they can still make modifications to the technical solutions described in the embodiments or make equivalent replacements to some or all technical features thereof without departing from the scope of the technical solutions of the embodiments of this application. All such modifications and equivalent replacements shall fall within the scope of claims and specification of this application. In particular, as long as there is no structural conflict, the various technical features mentioned in the embodiments can be combined in any manner. This application is not limited to the specific embodiments disclosed in this specification but includes all technical solutions falling within the scope of the claims.

What is claimed is:

1. A material feeding control method, wherein the method comprises:

receiving, by a computing device from a device end, verification information of a material being fed, wherein the device end obtains the verification information by identifying a verification identifier provided on a material package of the material being fed;

searching a historical feed database that stores historical verification information of materials for which feeding by suction at the device end has been completed; and under a condition that the historical verification information of the material being fed identical to the verification information of the material being fed is found in the historical feed database is found in the database, determining that the verification information of the material being fed is duplicated; generating and sending to the device end a first abnormal operation signal comprising a first alarm signal and a signal for controlling the device end to stop a suction operation and perform a lockout operation, under a condition that no identical historical verification information is found in the historical feed database, generating and sending to the device end an operation signal comprising a preset duration operation signal to control the device end to initiate a suction operation for a preset duration on the material being fed;

receiving a suction completion signal returned by the device end;

generating and sending a first control signal to the device end to control the device end to stop the suction operation according to the suction completion signal; and storing the verification information of the material being fed into the historical feed database after feeding completion.

2. The method according to claim 1, wherein the method further comprises:

under a condition that the verification information of the material being fed is determined to be different from the historical verification information of the historical feeds and a material code of the material being fed is determined to be different from a material code of a desired material, generating a second abnormal operation signal; wherein the second abnormal operation signal comprises a second alarm signal and/or a signal for controlling the device end to stop a suction operation.

3. The method according to claim 1, wherein the method further comprises:

under a condition that a material code of the material being fed is determined to be identical to a material code of a desired material, generating the operation signal.

4. The method according to claim 1, wherein the material being fed comprises main materials, and the main materials comprise multiple packages of materials being fed, the multiple packages of materials comprise a next material in one of the multiple packages, the multiple packages each having verification information obtained by the device end by identifying a verification identifier provided on a corresponding material package, and wherein the method further comprises:

after storing the verification information of the material being fed into the historical feed database after feeding completion, receiving, from the device end, verification information of the next material;

searching the historical feed database that stores historical verification information of materials for which feeding by suction at the device end has been completed, based on the verification information of the next material being fed;

under a condition that historical verification information identical to the verification information of the next material being fed is found in the historical feed database, determining that the verification information of the next material being fed is duplicated, and generating and sending to the device end a first abnormal operation signal comprising a first alarm signal and a signal for controlling the device end to stop a suction operation and perform a lockout operation; and under a condition that no identical historical verification information is found in the historical feed database, regenerating and resending the operation signal comprising the preset duration operation signal to control the device end to initiate a suction operation for a preset duration on the next material being fed, receiving a suction completion signal returned by the device end, generating and sending the first control signal to the device end to control the device end to stop the suction operation according to the suction completion signal, and storing the verification information of the next material being fed into the historical feed database after feeding completion of the next material.

5. The method according to claim 4, wherein, before obtaining verification information of the next material being fed in main materials, the method further comprises:

obtaining a remaining demand quantity for the main materials, wherein the remaining demand quantity is obtained by calculating a difference between a total demand quantity of main materials and a quantity of materials already sucked by the device end;

comparing the remaining demand quantity with a preset value;

under a condition that the remaining demand quantity is determined to be greater than or equal to the preset value, performing the steps of claim 4;

under a condition that the remaining demand quantity is determined to be less than a preset value, generating a second control signal and sending the second control signal to the device end to control the device end to stop the suction operation, thereby stopping suction of the main materials.

6. The method according to claim 1, wherein the operation signal further comprises a preset duration operation signal, wherein the preset duration operation signal is used to control the device end to perform a suction operation for a preset duration on the material being fed.

7. The method according to claim 1, further comprising:

obtaining an unlock input request initiated according to a user operation instruction of a user after sending the first abnormal operation signal to the device end;

determining whether the user has an unlock permission; and under a condition that the user is determined to not have an unlock permission based on currently logged-in user identity information, generating permission restriction prompt information.

8. The method according to claim 7, wherein the method further comprises:

under a condition that the user is determined to have an unlock permission based on the currently logged-in user identity information, generating and displaying an unlock input screen;

obtaining and verifying unlock verification information entered;

under a condition that verification of the unlock verification information is determined to be successful, generating an unlock signal based on the unlock verification information; and sending the unlock signal to the device end to control the device end to perform an unlock operation.

9. The method according to claim 7, wherein determining whether the user has the unlock permission comprises obtaining a rank of a currently logged-in user and determining whether the rank meets a preset rank requirement.

10. The method according to claim 1, wherein that the verification identifier comprises a quick response code, a barcode, and a radio frequency tag.

11. The method according to claim 1, wherein the preset duration is determined based on a ratio of an amount of each feeding to a suction amount per unit time of the device end.

12. The method according to claim 11, wherein the amount of each feeding is a fixed value, and the suction amount per unit time of the device end is a fixed value.

13. An electronic device comprising a memory and a processor, the memory storing a computer program, wherein the computer program when executed on the processor, causes the electronic device to perform the method according to claim 1.

14. A non-volatile computer readable storage medium storing a computer program, wherein the computer program when executed on an electronic processor, causes the electronic processor to perform the method according to claim 1.

* * * * *